US011358661B2

(12) United States Patent
Laugen et al.

(10) Patent No.: US 11,358,661 B2
(45) Date of Patent: Jun. 14, 2022

(54) TAPERED SHORT TUNNEL FOR A SNOWMOBILE

(71) Applicant: Polaris Industries Inc., Medina, MN (US)

(72) Inventors: Jesse J. Laugen, Roseau, MN (US); Cody S. Kofstad, Warroad, MN (US); Lyle J. Dahlgren, Roseau, MN (US); Luc C. Wilson, White Bear Lake, MN (US)

(73) Assignee: Polaris Industries Inc., Medina, MN (US)

( * ) Notice: Subject to any disclaimer, the term of this patent is extended or adjusted under 35 U.S.C. 154(b) by 196 days.

(21) Appl. No.: 16/723,789

(22) Filed: Dec. 20, 2019

(65) Prior Publication Data

US 2021/0188376 A1    Jun. 24, 2021

(51) Int. Cl.
*B62D 55/084* (2006.01)
*B62D 55/07* (2006.01)
*B62M 27/02* (2006.01)
*B60N 2/01* (2006.01)

(52) U.S. Cl.
CPC ......... *B62D 55/0847* (2013.01); *B62D 55/07* (2013.01); *B62M 27/02* (2013.01); *B60N 2/012* (2013.01); *B62M 2027/028* (2013.01)

(58) Field of Classification Search
CPC .... B62D 55/07; B62D 55/0847; B62M 27/02; B62M 2027/027; B62M 2027/028; B60N 2/012
USPC ................................ 180/9.25, 190, 182, 184
See application file for complete search history.

(56) References Cited

U.S. PATENT DOCUMENTS

| | | | |
|---|---|---|---|
| 3,850,353 A | 11/1974 | Foulds | |
| 6,109,217 A * | 8/2000 | Hedlund | F28F 1/12 123/41.01 |
| 6,371,233 B2 | 4/2002 | Ishii | |
| 6,585,465 B1 | 7/2003 | Hammond et al. | |
| 6,920,952 B2 | 7/2005 | Bertrand et al. | |
| 7,328,943 B2 | 2/2008 | Johnson et al. | |
| 7,380,629 B2 | 6/2008 | Vaisanen | |
| 7,753,154 B2 | 7/2010 | Maltais | |
| 8,381,857 B1 | 2/2013 | Sampson et al. | |
| 9,027,992 B2 | 5/2015 | Kawatani et al. | |
| D813,091 S * | 3/2018 | Tharp | D12/7 |
| 10,215,083 B2 | 2/2019 | Vezina et al. | |
| 10,300,990 B2 | 5/2019 | Vezina | |
| 10,435,117 B1 | 10/2019 | Cifers et al. | |
| 10,597,105 B2 | 3/2020 | Lefebvre et al. | |
| 10,676,157 B2 | 6/2020 | Vigen | |
| 10,730,576 B2 | 8/2020 | Labbe et al. | |

(Continued)

OTHER PUBLICATIONS

Canadian Office Action regarding Application No. 3,103,308, dated Feb. 24, 2022.

*Primary Examiner* — Minnah L Seoh
*Assistant Examiner* — Hosam Shabara
(74) *Attorney, Agent, or Firm* — Harness, Dickey & Pierce, P.L.C.

(57) ABSTRACT

A tapered short tunnel for use on a tracked vehicle, such as a snowmobile. The tapered short tunnel has a tapered distal end having a width less than a width of an endless track used on the snowmobile. This tapered portion reduces the snowmobile from catching or grabbing snow in a snow trench, thereby enabling the snowmobile to traverse deeper snow.

17 Claims, 15 Drawing Sheets

(56) References Cited

U.S. PATENT DOCUMENTS

| | | |
|---|---|---|
| 10,744,953 B2 | 8/2020 | Labbe et al. |
| 10,787,216 B2 | 9/2020 | Visenzi |
| 10,822,054 B2 * | 11/2020 | Lemieux ................ B62M 27/02 |
| 10,850,806 B2 | 12/2020 | Labbe et al. |
| 10,899,415 B2 | 1/2021 | Mangum et al. |
| 2003/0150658 A1 | 8/2003 | Nakano et al. |
| 2006/0043131 A1 | 3/2006 | Graham |
| 2010/0147916 A1 | 6/2010 | Roberts et al. |
| 2015/0210355 A1 | 7/2015 | Labbe et al. |
| 2021/0039749 A1 | 2/2021 | Labbe et al. |

* cited by examiner

TAPERED SHORT TUNNEL FOR A SNOWMOBILE

CROSS-REFERENCE TO RELATED APPLICATIONS

This application includes related subject matter similar to that disclosed in concurrently filed: (1.) U.S. patent application Ser. No. 16/723,754; U.S. patent application Ser. No. 16/723,745; and U.S. patent application Ser. No. 16/723,834. The entire disclosures of each of the above applications are incorporated herein by reference.

FIELD

The present disclosure relates to a tunnel that partially covers a track of a tracked vehicle and, more particularly, to a tapered short tunnel for use on a tracked vehicle, such as a snowmobile.

BACKGROUND

This section provides background information related to the present disclosure which is not necessarily prior art.

Tracked vehicles, such as a snowmobile, generally include a pair of front skis for steering and a rear endless track for driving or propelling the snowmobile. A chassis, or body, of the snowmobile includes a tunnel that is positioned over the track to support a seat and prevent snow from hitting the snowmobile occupants.

Snowmobiles can traverse various terrain and conditions. In deep powder snow that occurs frequently on mountain terrain, it is not uncommon to be riding in several feet of powder snow. Such riding can result in forming a deep trench or trenching in the snow because of the track. Such trenching can cause the rear of the snowmobile to fall into the trench.

Because the tunnel is generally covering the track about the top and sides of the track, the tunnel is wider than the track. This width of the tunnel can cause catching or grabbing at the rear of the tunnel in the sidewall of the trench that is formed by the track. Such a catching or grabbing results because the track is narrower than the tunnel. Such catching or grabbing can cause the snowmobile to stick or get stuck in the trench, thereby stopping the snowmobile. Accordingly, there is a need to provide an improved tunnel that reduces or eliminates anchoring or sticking in deep trenches, thereby enabling the snowmobile to efficiently traverse such terrain without getting stuck.

SUMMARY

This section provides a general summary of the disclosure, and is not a comprehensive disclosure of its full scope or all of its features.

A snowmobile tunnel is configured to cover at least a portion of an endless track that has a track width. The snowmobile tunnel includes a top plate that extends along a longitudinal axis from a first proximal end to a second distal end. The top plate has a first side edge and an opposed second side edge. A first sidewall extends from the first side edge of the top plate. A second sidewall extends from the second side edge of the top plate. The snowmobile tunnel includes a distal tapered portion that has a tunnel width less than the track width.

A snowmobile to traverse terrain. The snowmobile includes at least one front ski that is configured to steer the snowmobile. The snowmobile further includes an endless track having a track width and configured to propel the snowmobile. The at least one ski and the endless track are coupled to a chassis that includes a tunnel. The tunnel partially covers at least a portion of the track. The tunnel includes a top plate that extends along a longitudinal axis from a first proximal end to a second distal end. The top plate has a first side edge and an opposed second side edge. A first sidewall extends from the first side edge of the top plate. A second sidewall extends from the second side edge of the top plate. The tunnel includes a distal tapered portion that has a tunnel width less than the track width.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
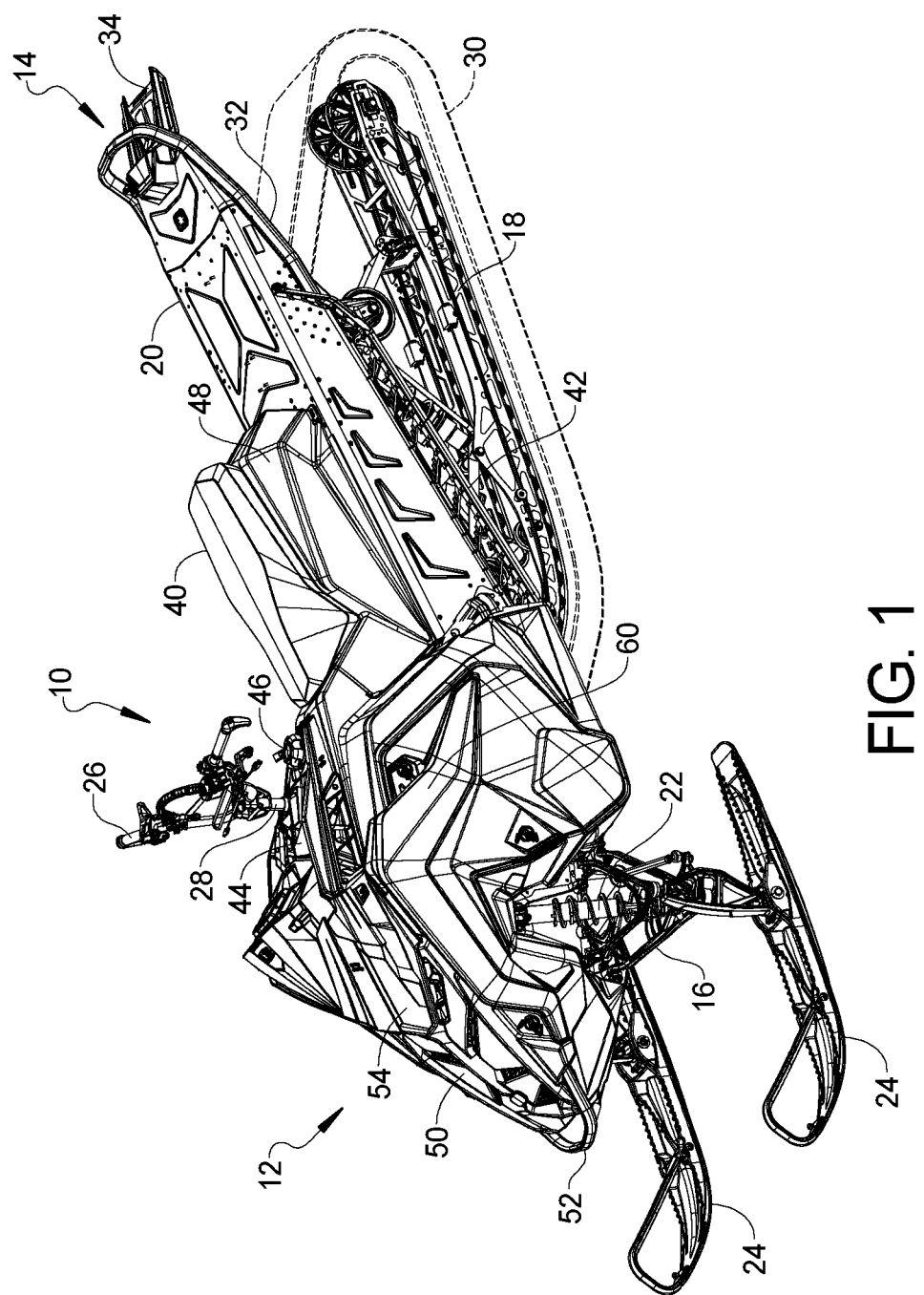
FIG. 1 is a perspective view of an exemplary snowmobile in accordance with the present disclosure.
Figure 2:
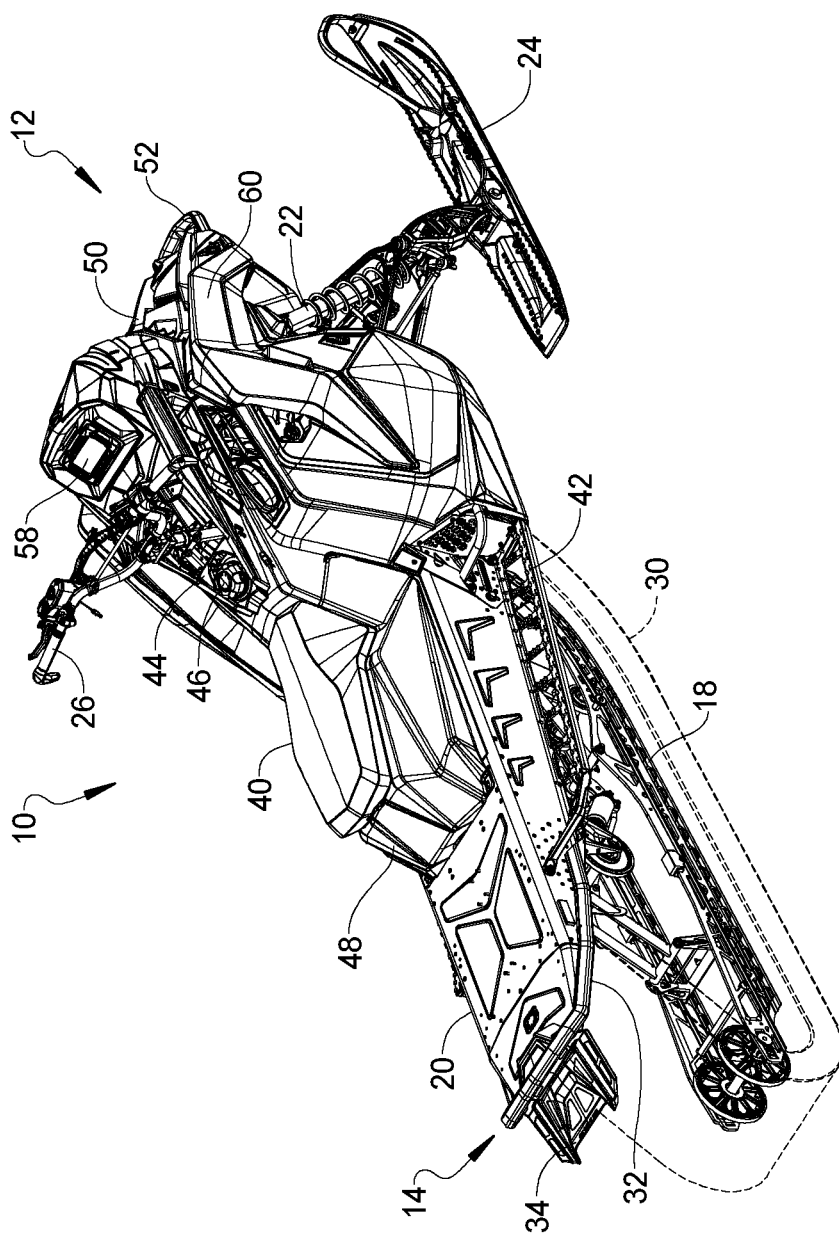
FIG. 2 is another perspective view of the snowmobile of FIG. 1.
Figure 3:
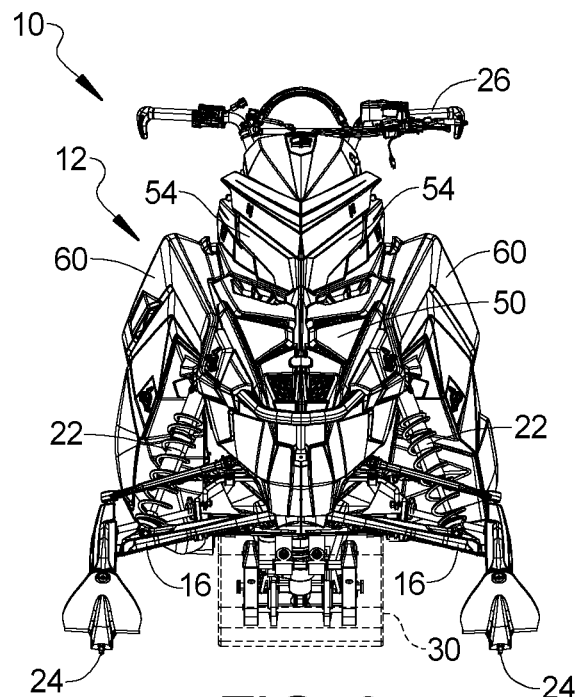
FIG. 3 is a front view of the snowmobile of FIG. 1.
Figure 4:
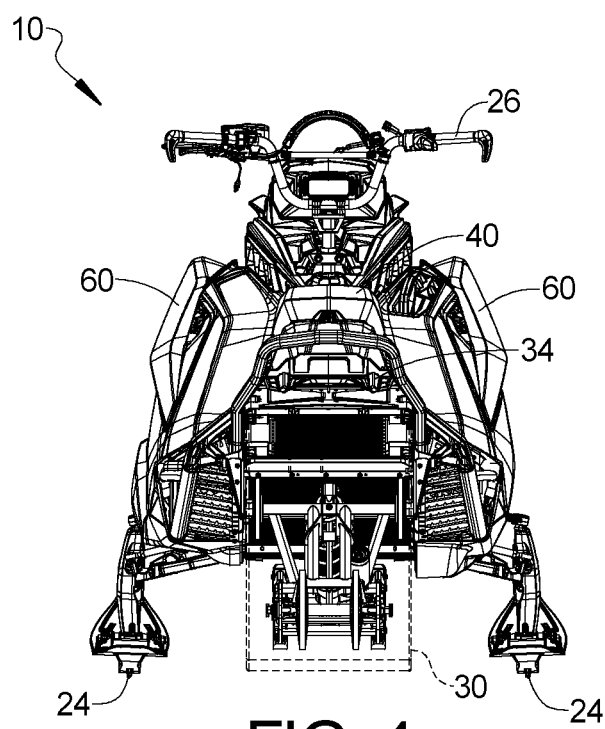
FIG. 4 is a rear view of the snowmobile of FIG. 1.
Figure 5:
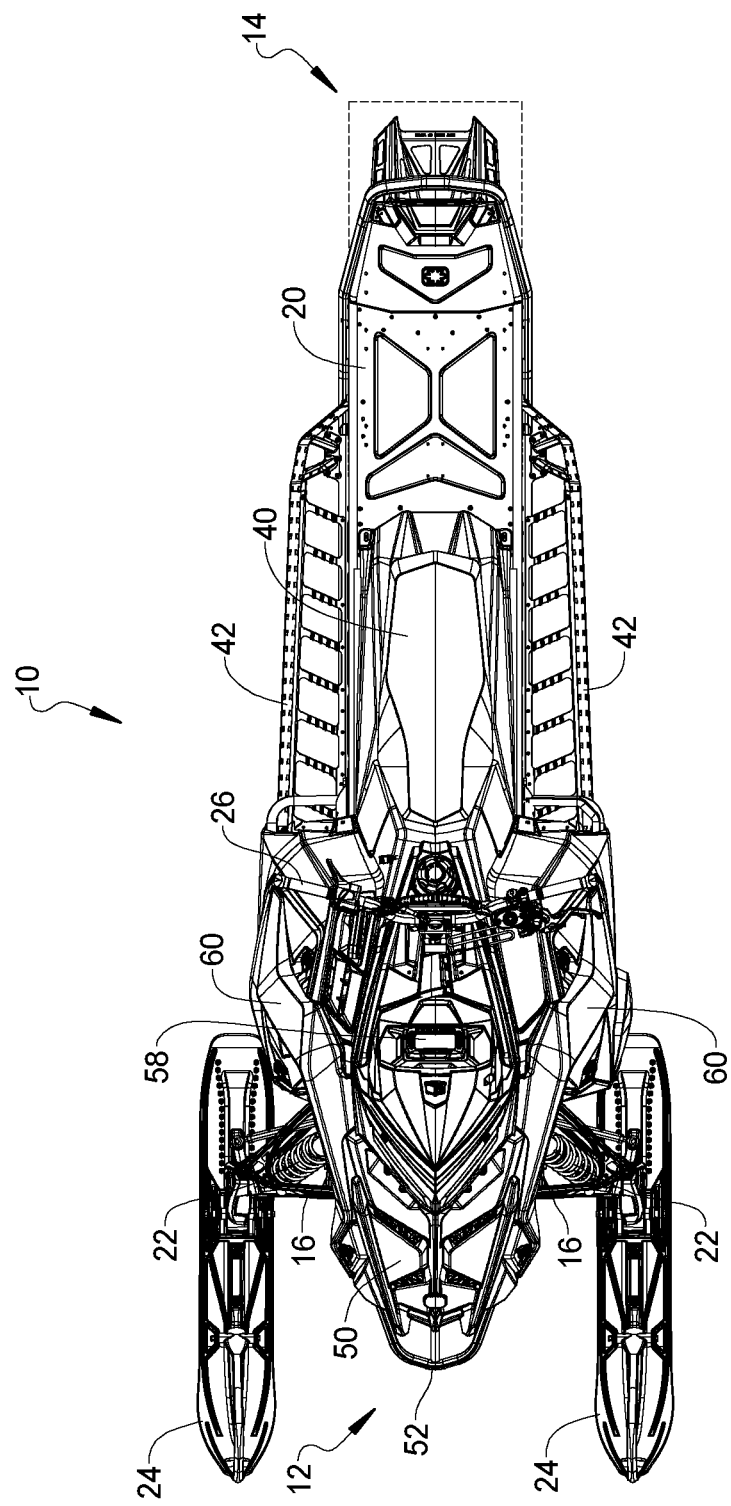
FIG. 5 is a top view of the snowmobile of FIG. 1.

Example embodiments will now be described more fully with reference to the accompanying drawings.

With initial reference to FIGS. 1-6, an exemplary vehicle in accordance with the present disclosure is illustrated. Although the vehicle is illustrated as a snowmobile 10, numerous aspects of the present disclosure may be included with any other suitable vehicle as well. The snowmobile 10 may be any suitable type of snowmobile, such as any suitable trail snowmobile, sport trail snowmobile, touring snowmobile, performance snowmobile, utility snowmobile (such as any snowmobile suitable for search and/or rescue, law enforcement, military operations, etc.), crossover snowmobile, mountain snowmobile, youth snowmobile, etc.

The snowmobile 10 generally includes a front end 12 and a rear end 14. At the front end 12 is a front suspension 16. At the rear end 14 is a rear suspension 18. The front suspension 16 and the rear suspension 18 support a chassis 20.

The front suspension 16 includes shock absorbers 22, each one of which is connected to a ski 24. The shock absorbers 22 may be any dampening devices suitable for absorbing shock resulting from the skis 24 passing over uneven terrain. The skis 24 are steered in part by a suitable steering device, such as handlebars 26.

Coupled to the rear suspension 18 is a belt or track 30, which is an endless or continuous belt or track 30. Rotation of the track 30 propels the snowmobile 10. The track 30 is circulated through a tunnel 32 defined at least in part by the chassis 20. The tunnel 32 is tapered at the rear end 14, as described in detail herein. Mounted at the rear end 14 is a flap 34, which blocks snow and other debris from being "kicked-up" by the track 30.

Mounted to the chassis 20 and atop the tunnel is a seat 40 for the operator of the snowmobile 10. On both sides of the chassis 20 or tunnel 32 are footrests 42, upon which the operator may rest his or her feet when seated on the seat 40. The seat 40 is positioned to allow the driver to grasp the handlebars 26 for steering the snowmobile 10. The handlebars 26 are mounted to a steering rod 28, which protrudes out from within the center console 44. At the center console 44 is a fuel cap 46 of a fuel tank 48. Any suitable accessory 36 (see FIG. 6) may be mounted to the chassis 20 behind the seat 40.

At the front end 12 of the snowmobile 10 is a hood assembly 50, which is mounted on top of a nose pan 68. Mounted to the hood assembly 50 and protruding from a forwardmost end thereof, is a front bumper 52. The hood assembly 50 houses headlights 54. An optional windshield 56 is connected to an uppermost portion of the hood assembly 50. Associated with the hood assembly 50 is a display 58 viewable by the operator when seated on the seat 40. Mounted to opposite sides of the hood assembly are body panels 60, which are advantageously interchangeable.

Figure 6:
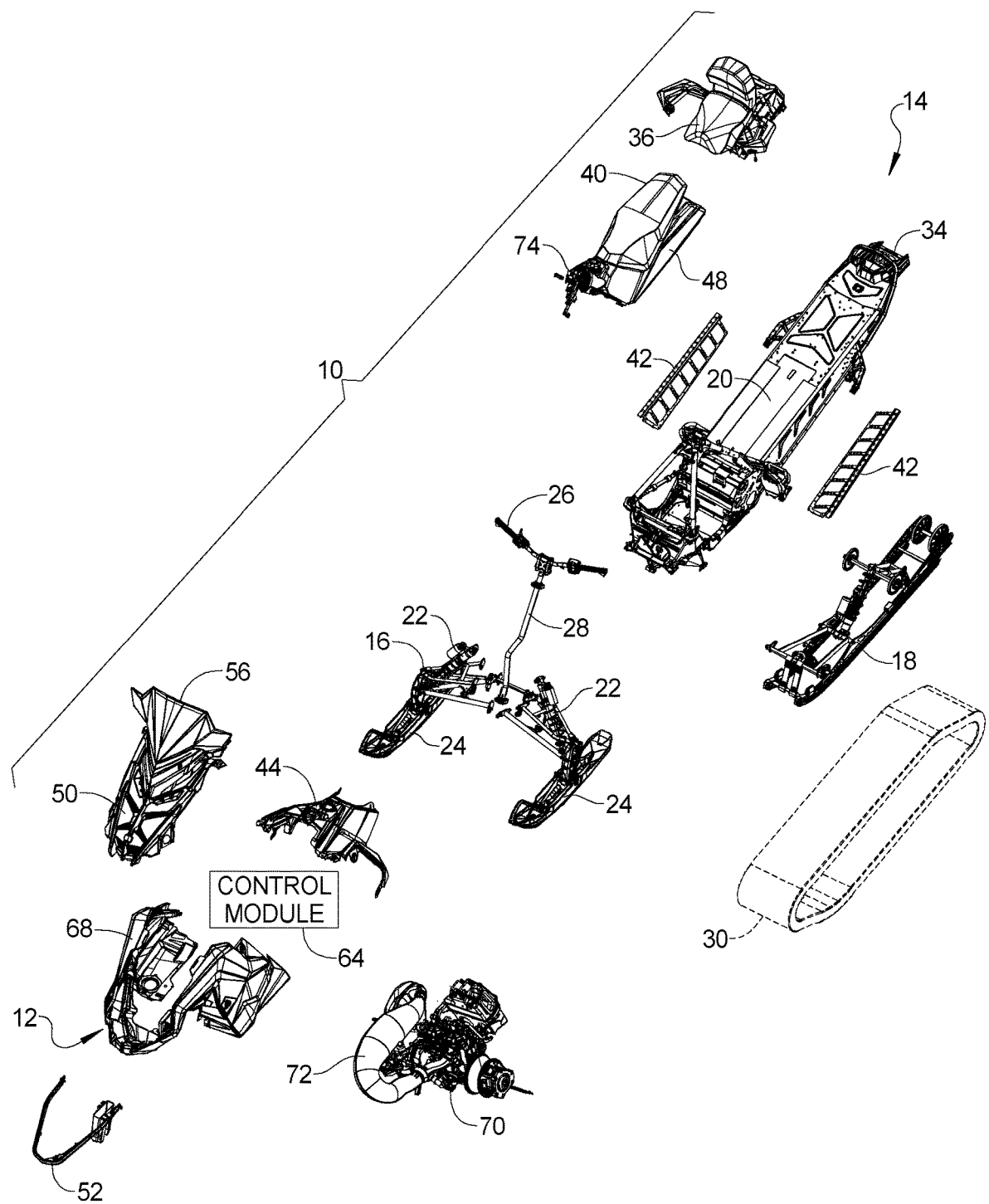
FIG. 6 is an exploded view of the snowmobile of FIG. 1.

With particular reference to FIG. 6, the snowmobile 10 further includes an engine assembly 70. The engine assembly 70 generates power for driving the track 30. The engine assembly 70 may include any suitable engine, such as an electric, 2-stroke, and 4-stroke engine. Coupled to the engine assembly 70 is an exhaust assembly 72. Any suitable exhaust assembly may be used. Oil for the engine assembly 70 is stored in an oil tank assembly 74, which may be arranged proximate to the seat 40.

The snowmobile 10 further includes any suitable control module 64. The control module 64 may be arranged at any suitable location, such as within the hood assembly 50, beneath the center console 44, or within any suitable control mounted to the handlebars 26. The term "control module" may be replaced with the term "circuit." The term "control module" may refer to, be part of, or include processor hardware (shared, dedicated, or group) that executes code and memory hardware (shared, dedicated, or group) that stores code executed by the processor hardware. The code is configured to provide the features of the control module described herein. The term memory hardware is a subset of the term computer-readable medium. The term computer-readable medium, as used herein, does not encompass transitory electrical or electromagnetic signals propagating through a medium (such as on a carrier wave). The term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

Figure 7:
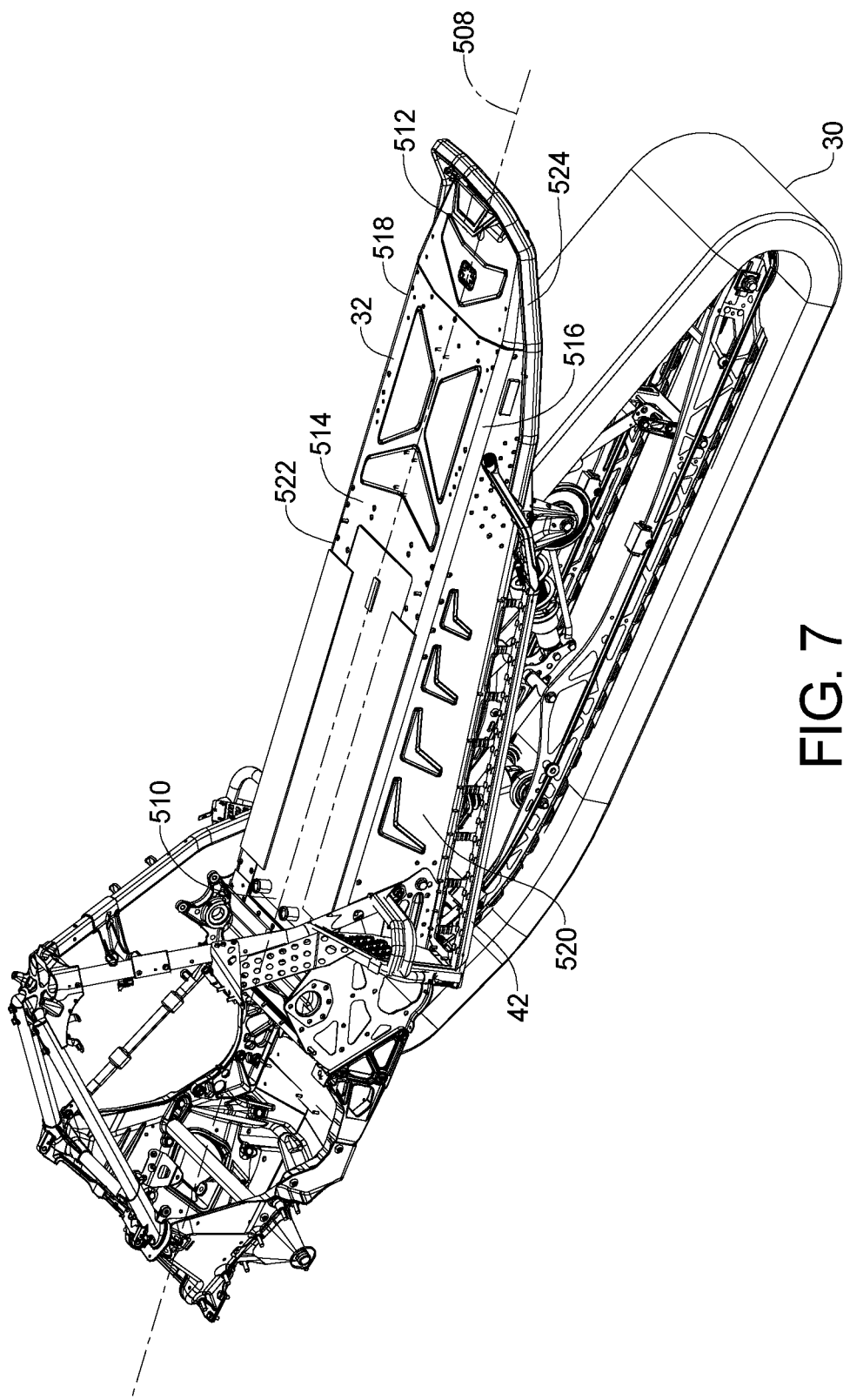
FIG. 7 is a rear perspective view illustrating a tunnel of the snowmobile, in accordance with the present disclosure.
Figure 8:
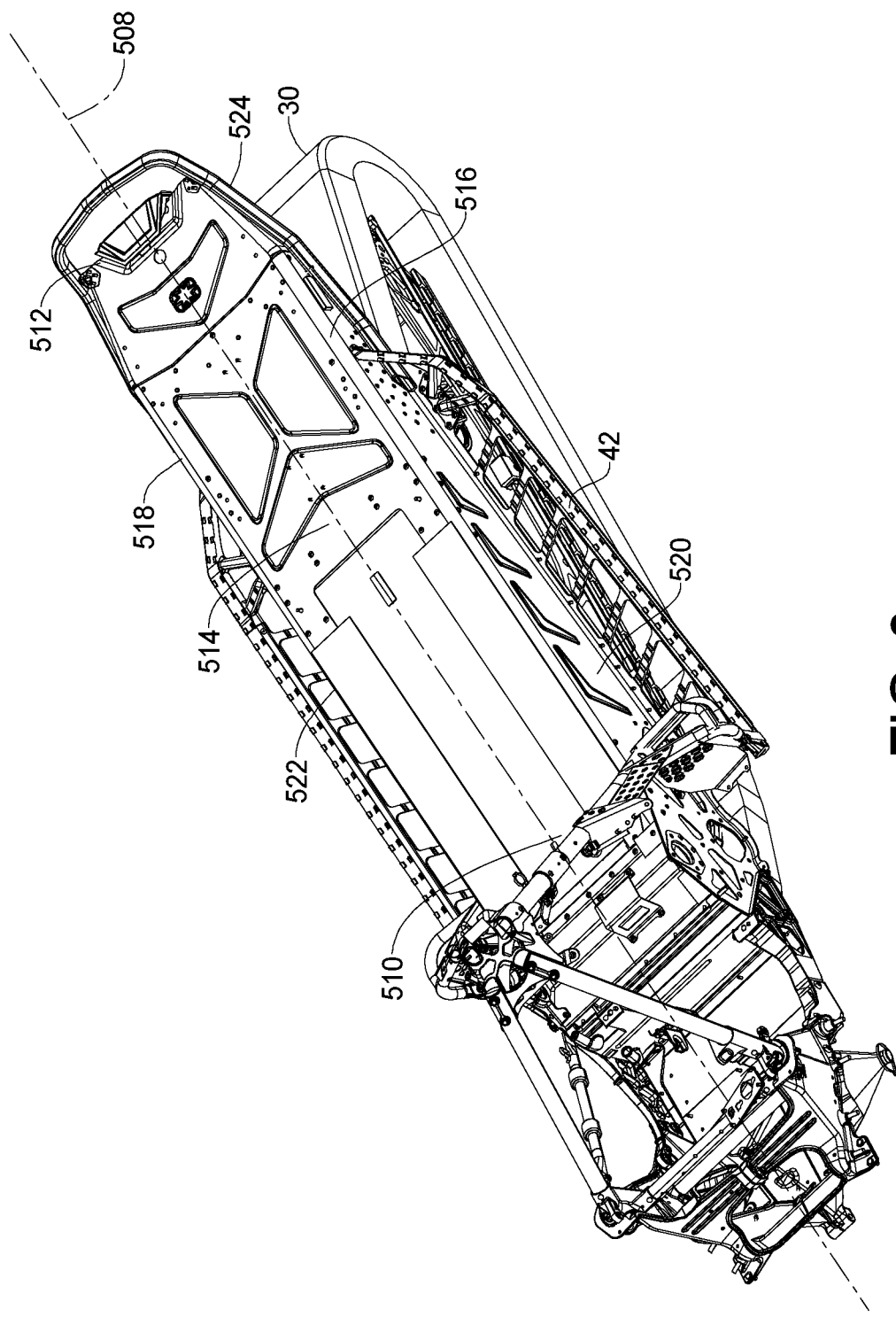
FIG. 8 is another perspective view of the tunnel of the present disclosure.
Figure 9:
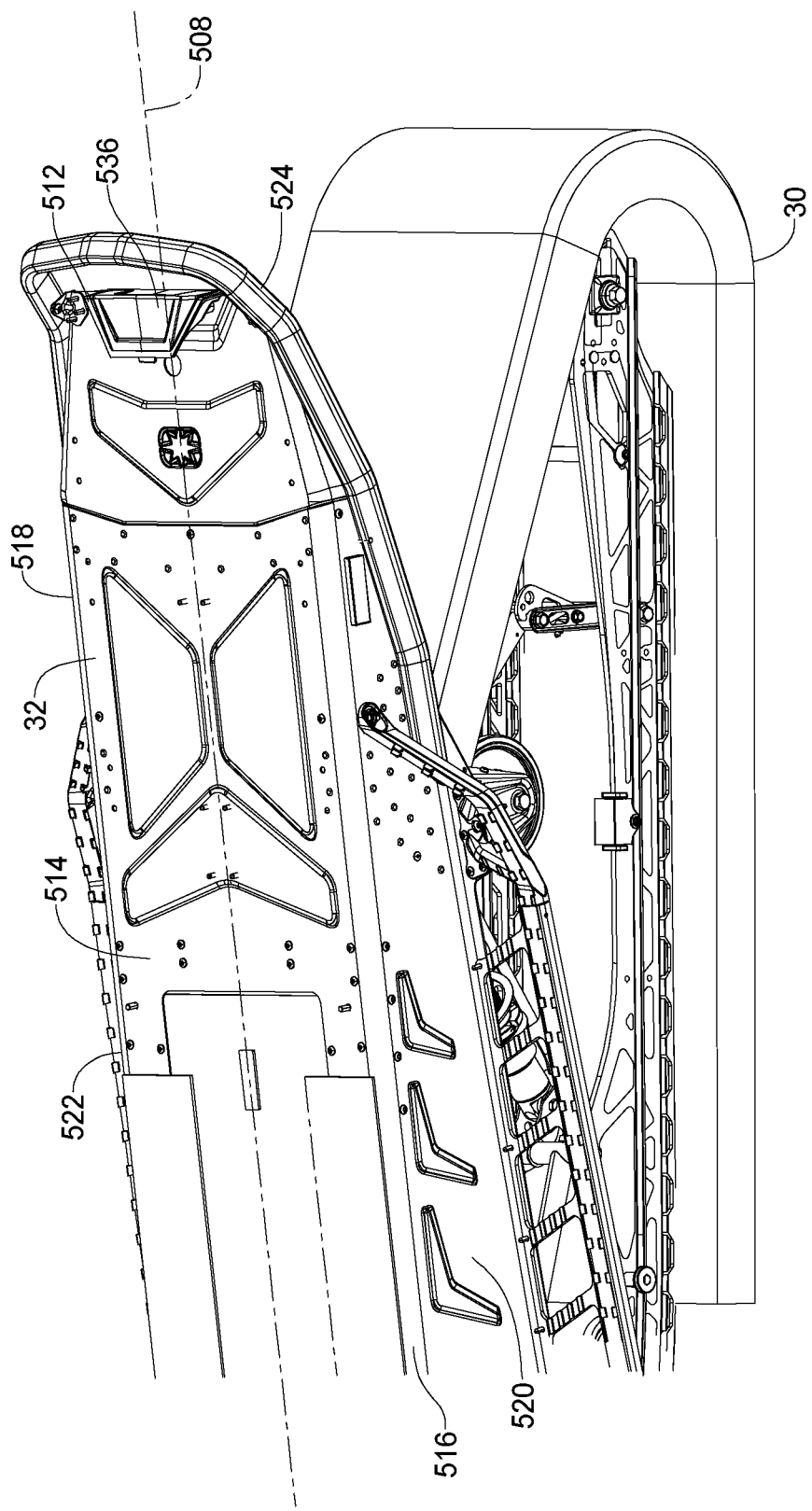
FIG. 9 is a side perspective view of the tunnel of the present disclosure.

Referring to FIGS. 7-9, the tunnel 32 is illustrated in various perspective views. The tunnel 32 extends along a longitudinal axis 508 from a first proximal end 510 to a second distal end 512. The tunnel 32 has an overall length of about 1733 mm, with a range of lengths between about 1733 mm to about 2100 mm. The tunnel 32 includes an upper substantially planar or top plate 514 bounded by the first proximal end 510 and the opposed second distal end 512 and a first side edge 516 and an opposed second side edge 518. Extending at about 90° from the top plate 514 is a first tapered sidewall 520 and extending at about 90° from the second side edge 518 is a second tapered sidewall 522. The tunnel 32 is formed from aluminum or other appropriate substantially light rigid material, such as composite material. The tunnel is shaped to substantially cover the track 30 and support the seat 40 and fuel tank 48. The top plate 514 and the sidewalls 520 and 522 can be formed separately and attached to one another, such as by welding, riveting, fasteners, adhesives, etc. Alternatively, the tunnel 32 can be bent or shaped to form an integral one-piece construct.

Figure 10:
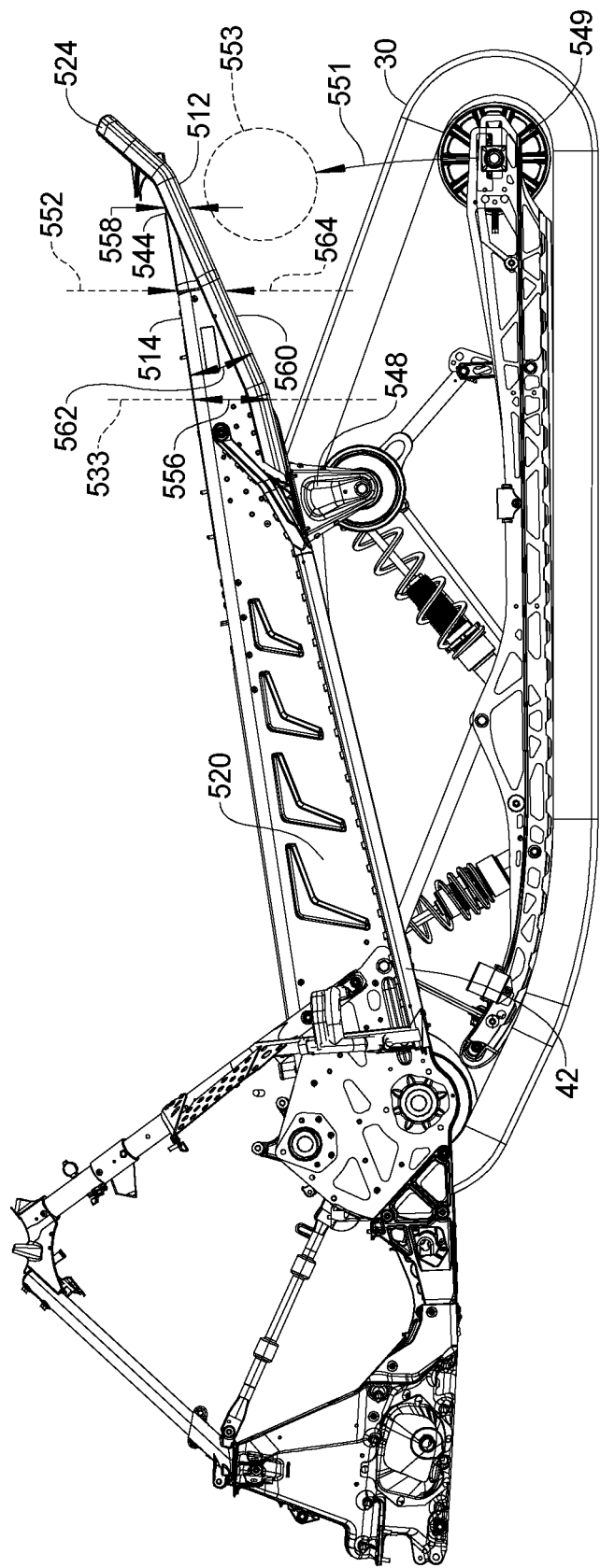
FIG. 10 is a side view of the tunnel and track assembly.
Figure 11:
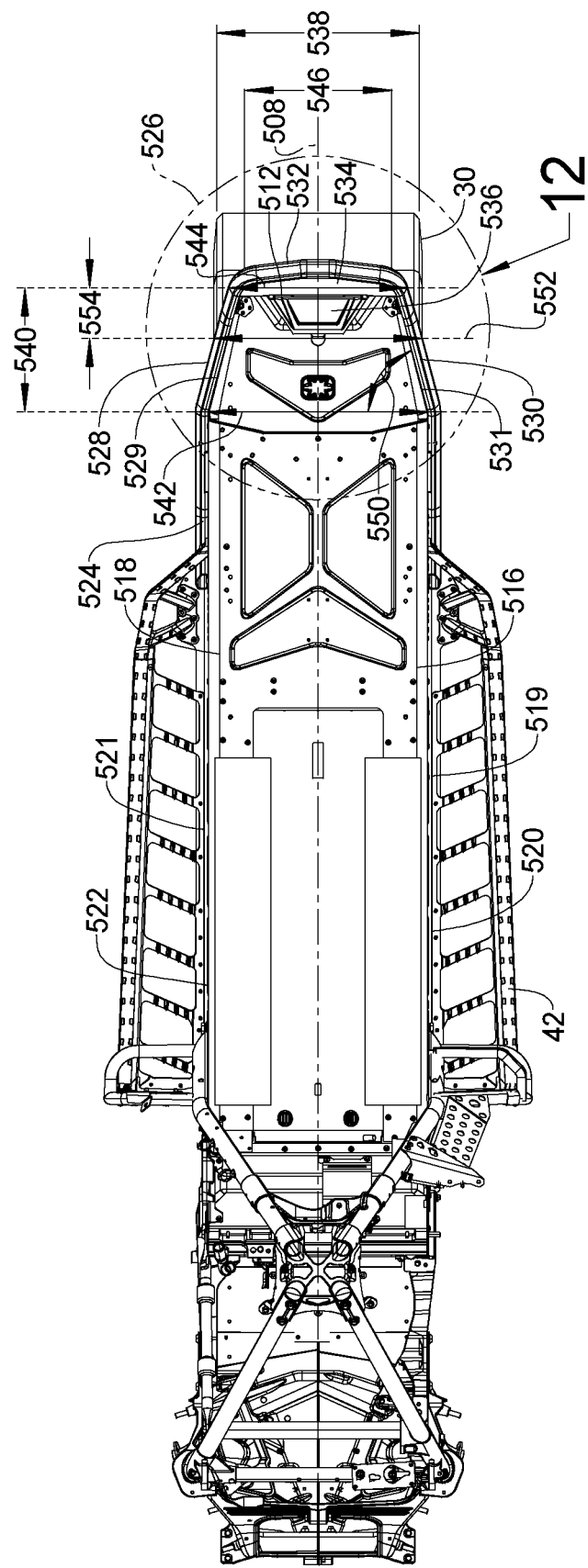
FIG. 11 is a top view of the tunnel.
Figure 12:
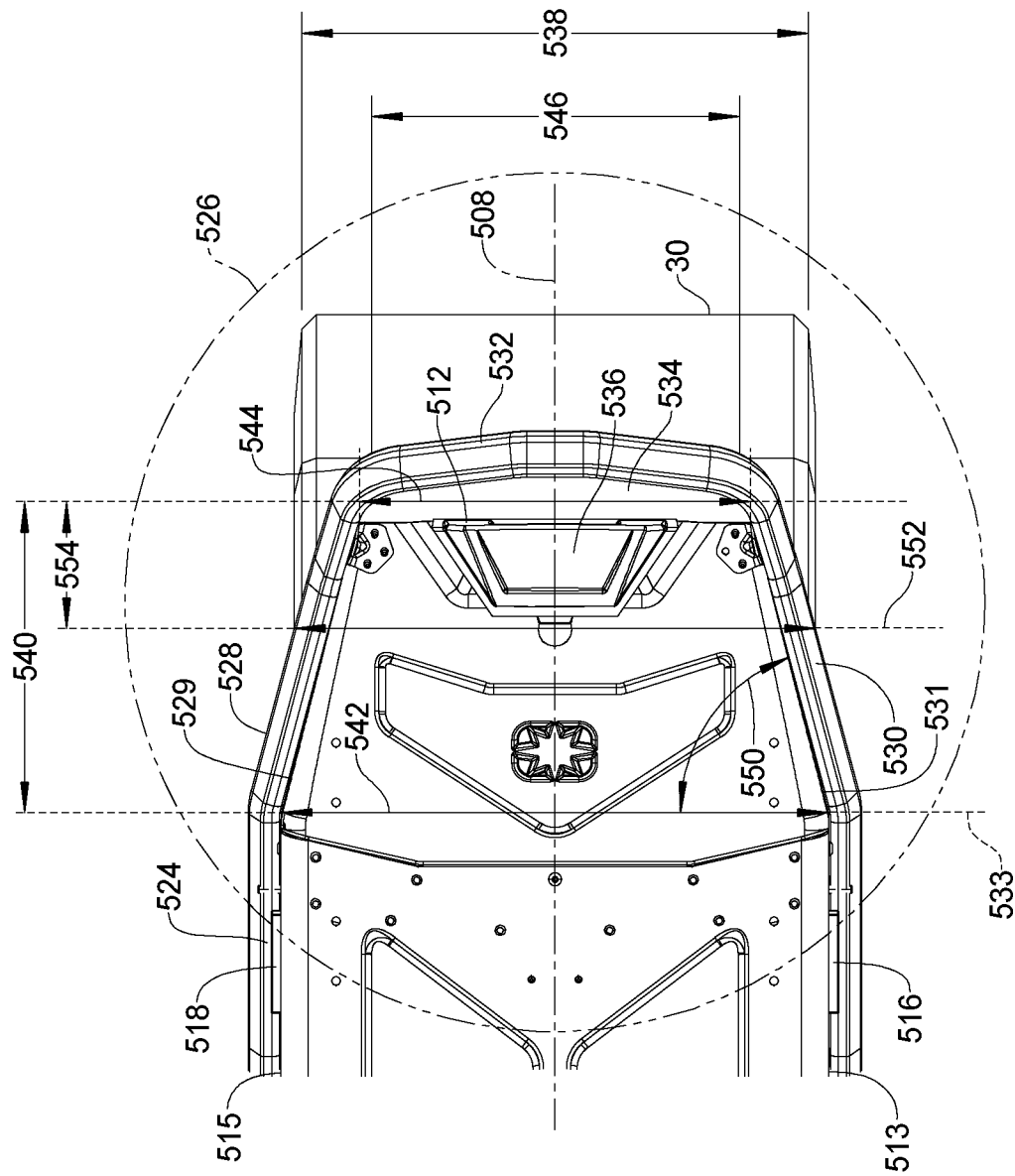
FIG. 12 is an enlarged top view of a tapered portion of the tunnel relative to the track.

Attached to the tunnel 32 are the footrests 42 that are attached to the first tapered sidewall 520 and the second tapered sidewall 522. Extending rearward from the footrests 42 is a bumper 524 that is attached to the tunnel 32 with fasteners, such as screws, rivets, or bonding. As illustrated in FIGS. 10-12, the tunnel 32 includes a distal tapered portion 526. The distal tapered portion 526 of the tunnel 32 provides tapering both along the plane of the upper top plate 514 and along the first and second tapered sidewalls 520 and 522. As illustrated in FIGS. 10-12, the bumper 524 extends around the perimeter of the distal tapered portion 526 from the footrests 42. The bumper 524 extends out beyond the tunnel 32 and includes first and second angled portions 528 and 530 that attach to and follow corresponding angled portions 529 and 531 of the tunnel 32. An upturned end portion 532 extends beyond the second distal end 512 of the tunnel 32 to define a handle 534. Positioned adjacent to the upturned end 532 is a rear tail light 536 that is attached atop the tunnel 32.

As noted in FIG. 12, the track 30 has a width 538. The width of the track 30 can vary between about 304.8 mm to about 609.6 mm, and the illustrated track is about 381 mm in width. The length 540 of the tapered portion 526 of the tunnel 32 along longitudinal axis 508 is constant at about 231.14 mm for the noted track 30 having a width of about 381 mm. This results in the tapered portion 526 being about 11% to about 14% of the overall length of the tunnel 32. The taper of the tunnel 32 starts at a transition line or plane 533 with a tunnel width of about 398.78 mm, identified by reference numeral 542, having an overall assembly width that includes the bumper 524 of about 447.04 mm. A second width 544 at the distal end 512 of the tunnel 32 includes a width of about 289.56 mm and an overall assembled width, including the bumper 524 of about 350.52 mm. A rearwardmost width 546 of the bumper 524 is about 325.12 mm.

A first portion 513 of the first side edge 516 is parallel to a first portion 515 of the second side edge 518 up to the transition line or plane 533 having the width 542. First portions 519 and 521 of the first and second sidewalls 520 and 522 are also parallel to one another along the first portions 513 and 515 of the first and second side edges 516 and 518. These edges 516 and 518 and sidewall portions 519 and 521 are also parallel to the longitudinal axis 508. At this point 533, near the upper track support wheel 548 location, the tunnel 32 begins to taper inward toward the longitudinal axis 508 at an angle of about 75°, identified by reference numeral 550. As noted in FIG. 12, the distal end 512 of the tunnel 32 does not extend beyond the track 30 and is, thus, shorter than the distalmost end of the track 30. The rearwardmost portion of the bumper 524 also does not extend beyond the track 30, as illustrated in FIG. 12.

At intersection line or plane 552, the tapered tunnel portion 526 and the bumper 524 crosses over, or intersects, the track 30, as illustrated in FIG. 12. In other words, the intersection line or plane 552 is a line or plane perpendicular to axis 508 and where the tunnel width including the bumper 524 width is about 381 mm corresponding to the track width. This intersection line 552 extends a distance of about 80 mm from the second distal end 512 of the tunnel 32, identified by reference numeral 554. Thus, the tunnel 32, including the assembly with the bumper 524, crosses over the track 30 before the second distal end 512. Such a configuration reduces anchoring or sticking of the tunnel 32, particularly the rear of the tunnel 32, relative to a deep snow trench, further discussed herein.

Turning to FIG. 10, the side view of the distal tapered portion 526 is illustrated. At the transition line or plane 533 where the tunnel 32 begins to taper relative to the longitudinal axis 508 of the top plate 514, a height 556 of the tunnel sidewall is about 137.5 mm. At the second distal end 512 of the tunnel 52 at the second width 544, the height of the tunnel sidewall is about 9.5 mm, identified by reference numeral 558. This results in a 14.5-to-1 reduction in sidewall height along the length 540. This height reduction is achieved by having a lower edge 560 extending at an angle 562 of about 11.8° relative to the top plate 514. This substantial reduction in height, as well as providing a substantially thin (i.e. 9.5 mm or less than 10 mm) distal end 512 substantially reduces catching or grabbing snow by the tunnel 32 that can act as an anchor in a deep snow trench. At the intersection line or plane 552 where the tunnel 32 intersects or crosses over the track 30, the height of the sidewall 564 is about 58 mm at the track crossover area.

As illustrated in FIG. 10, since the transition line or plane 533 of the tapered portion 526 of the tunnel 32 begins near or adjacent to the upper track wheel mounting 548, this helps prevent impingement of the tunnel 32 onto the track 30. Additionally, the rear suspension track support wheel 549 can travel along an arc 551 to the dashed area identified by reference numeral 553 during full suspension travel. Since this full range of travel occurs substantially below the lower edge 560 at the intersection line or plane 552, substantially no impingement between the tunnel 32 and the track 30 occurs in this crossover or intersection point 552. This enables the track 30 to be wider than the tunnel 32 at the distal end of the tunnel 32 without causing impingement between the tunnel 32 and the track 30, while also providing the benefit of eliminating the rear of the tunnel 32 from grabbing or sticking in snow, particularly in deep trenches.

Figure 13A:
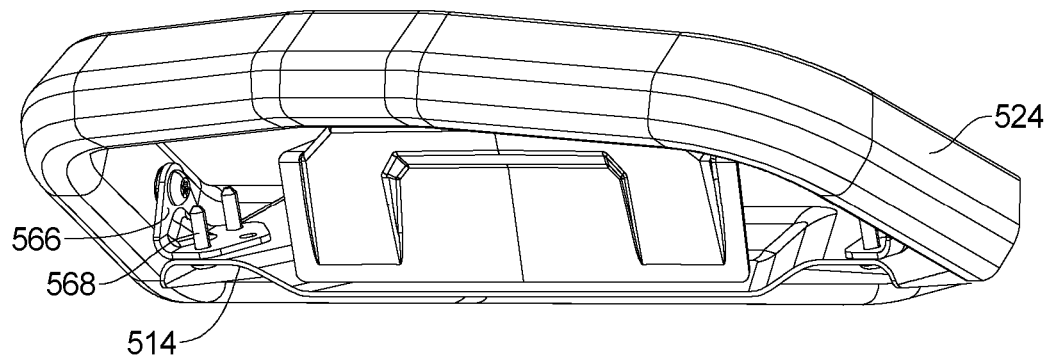
FIG. 13A is a perspective view of an attachment of a bumper to the tunnel.
Figure 13B:
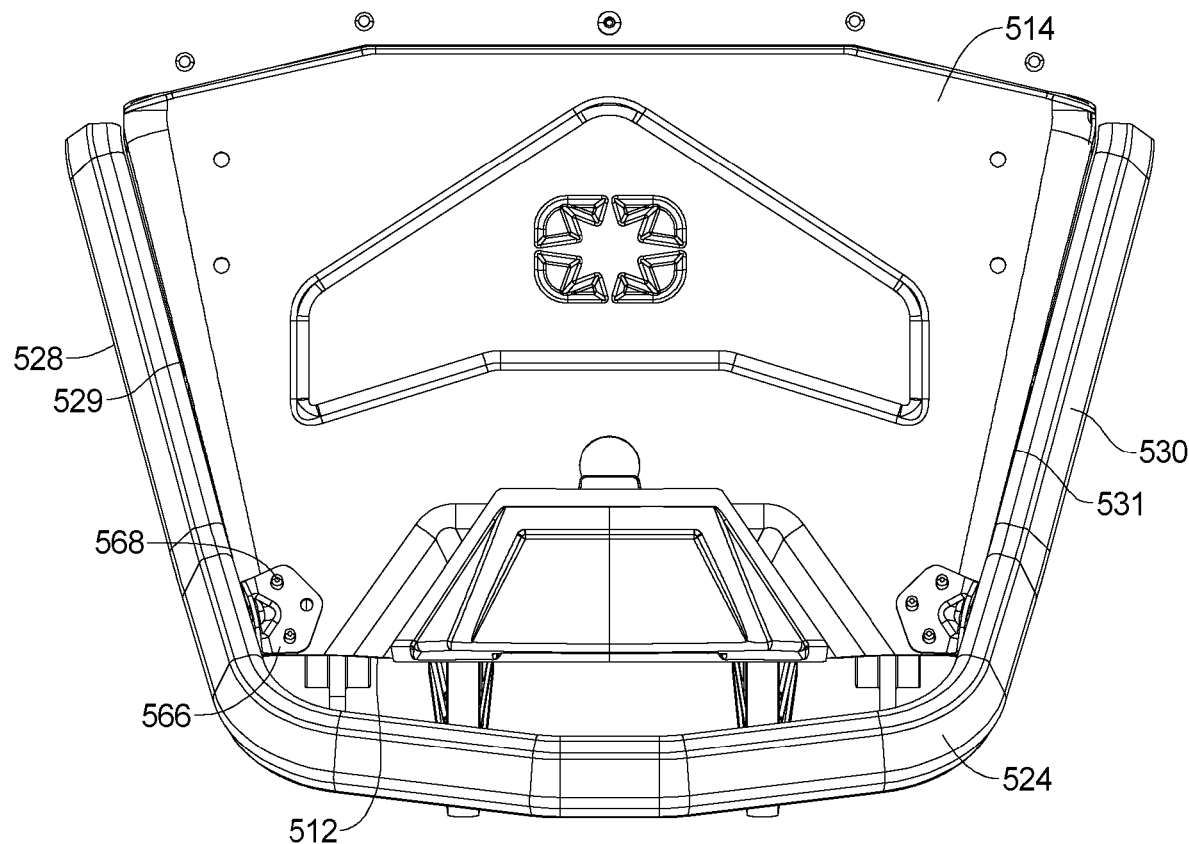
FIG. 13B is a top view of the attachment of the bumper to the tunnel.

Turning to FIGS. 13A-13B, it is further noted that the rear of the bumper 524 is attached above the tunnel 32 using an L-bracket 566 that is positioned atop the upper top plate 514. The bumper 524 is attached by way of fasteners 568, such as screws or rivets, to retain the bumper 524 above the distal end 512 of the tunnel 32. This, again, eliminates any area at the distalmost end 512 of the tunnel 32 that could catch or grab snow or that could act as an anchor to provide additional drag on the snowmobile 10, causing the snowmobile 10 to potentially get stuck in a trench, further discussed herein.

Figure 14:
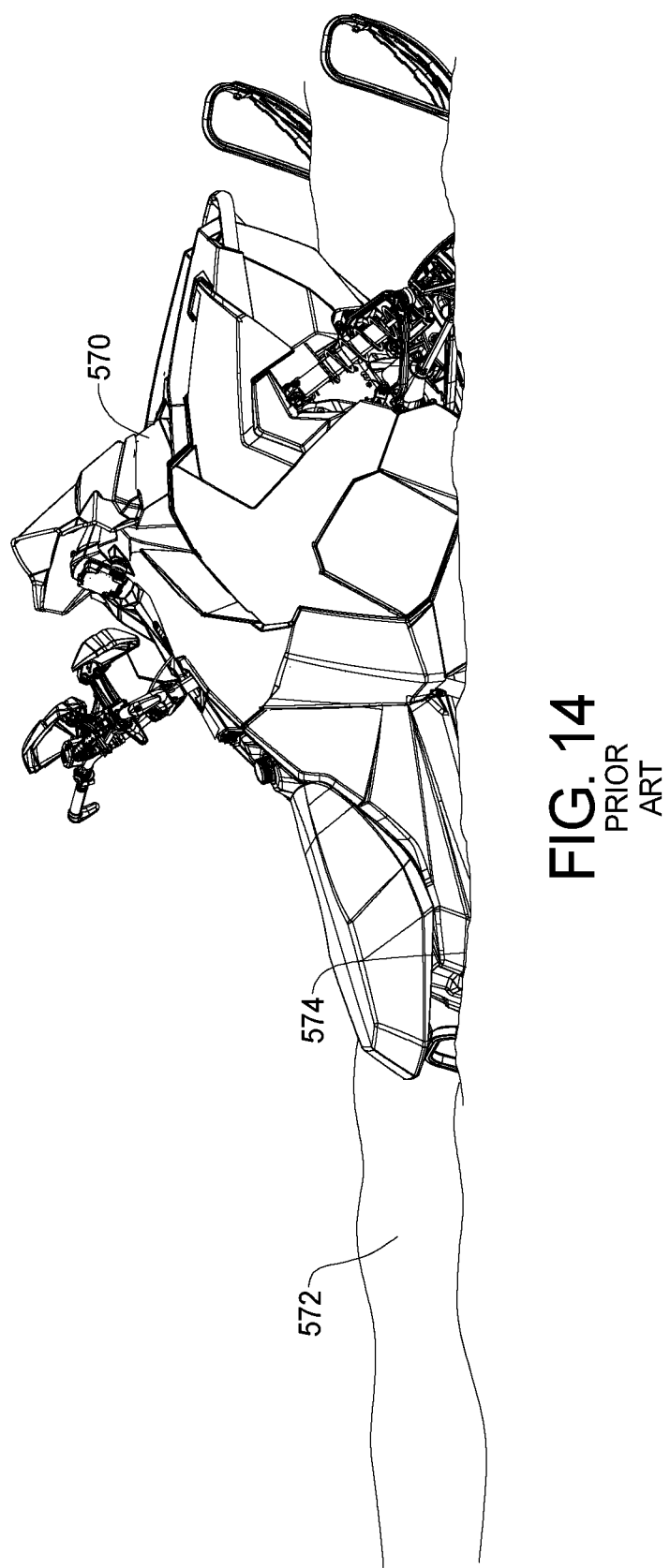
FIG. 14 is an environmental prior art view of a snowmobile caught in a trench.
Figure 15:
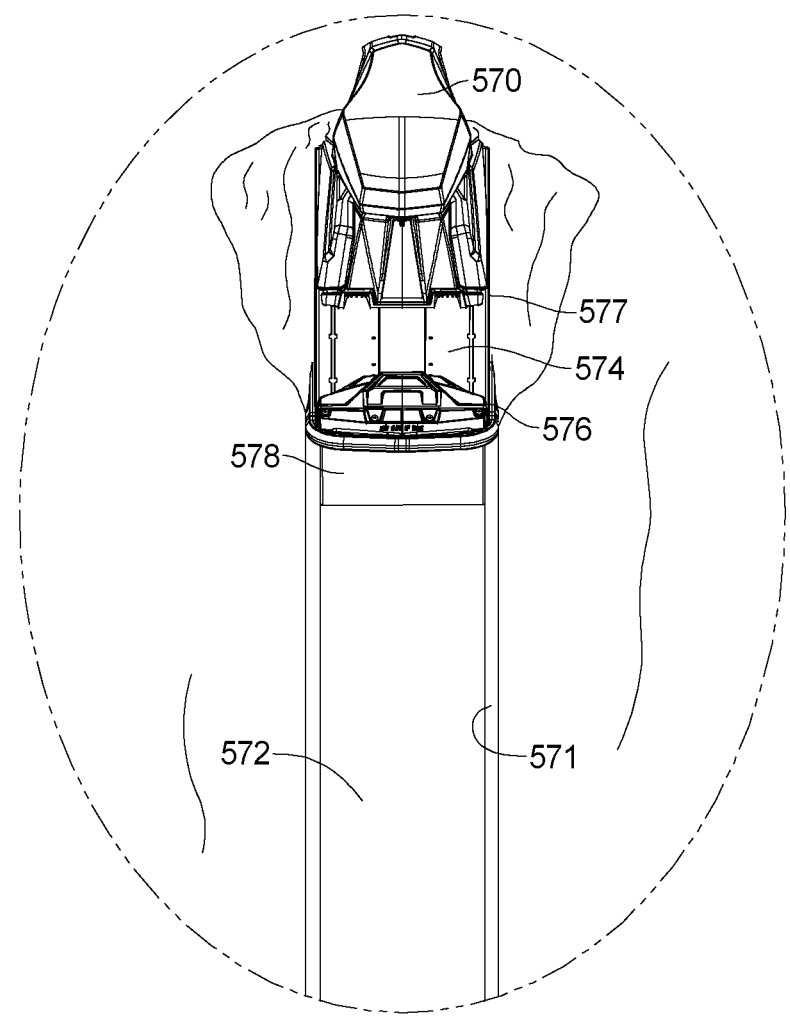
FIG. 15 is a prior art environmental view of the snowmobile of FIG. 14, shown illustrated within the trench.

Turning to FIGS. 14-15, a prior art snowmobile 570 is illustrated stuck within a deep snow trench 572. As illustrated in FIG. 14, a rear 574 of the snowmobile 570 has fallen into the deep snow trench 572. As illustrated in FIG. 15, this causes the tunnel 576, particularly the rear of tunnel 576, that has two substantially opposed parallel sidewalls 577 and a width wider than a track 578 to act as an anchor and grab the snow along the sidewall 571 of the snow trench 572. Such a condition can slow down the snowmobile 570 to a point where the snowmobile 570 becomes stuck in the snow trench 572.

Figure 16:
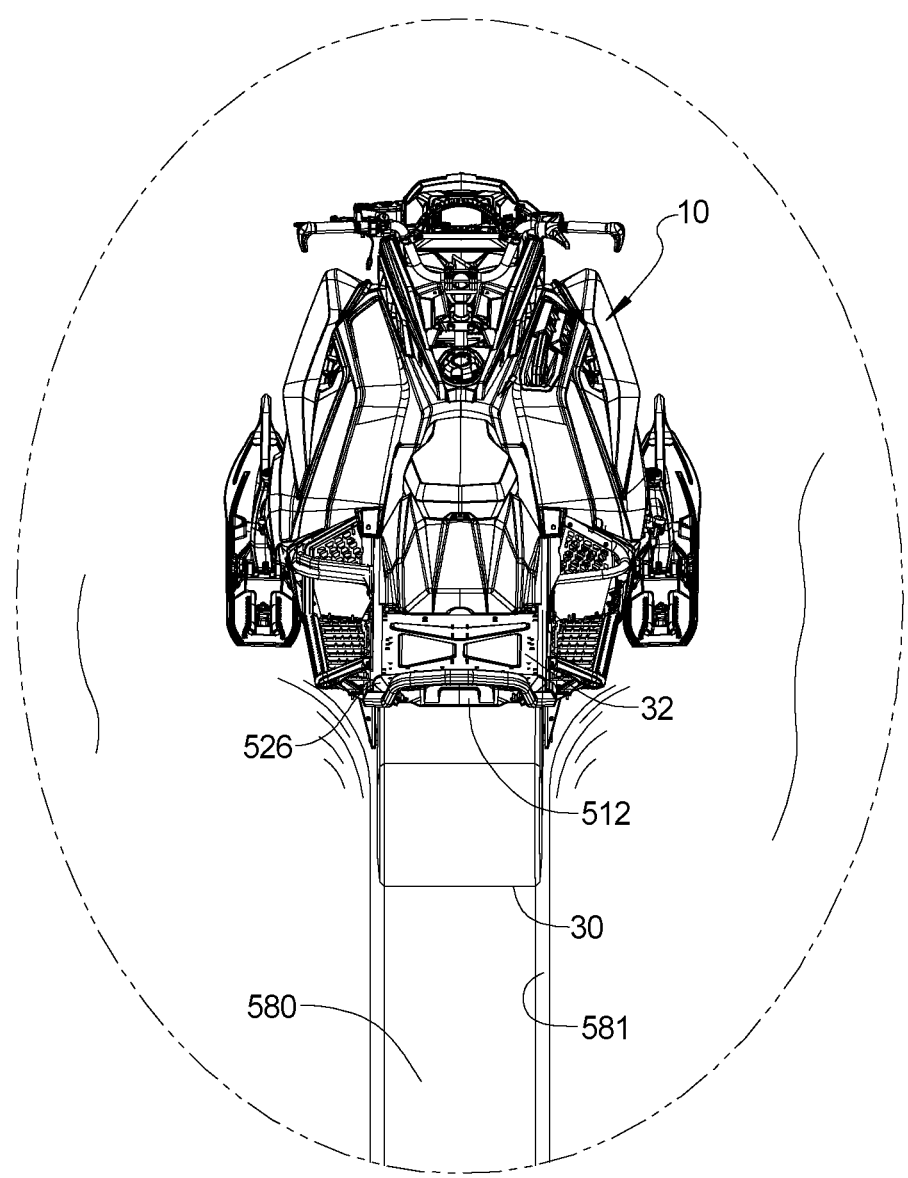
FIG. 16 is an environmental view of the tunnel of the present disclosure, illustrated within a snow trench.

Turning to FIG. 16, the present snowmobile 10 having the tapered tunnel 32 is illustrated, where the tapered tunnel 32 is shown within a snow trench 580, where the distal tapered portion 526 being both tapered along the top plate 514, as well as on the sidewalls 520 and 522, does not cut into a sidewall 581 of the snow trench 580 since the distal end 512 is narrower than the track 30 and, thus, narrower than the trench 580. This enables the snowmobile 10 to traverse very deep snow while substantially reducing the chance that the snowmobile 10 becomes stuck in the snow trench 580.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A snowmobile tunnel configured to cover at least a portion of an endless track having a track width, the snowmobile tunnel comprising:
   a top plate extending along a longitudinal axis from a first proximal end to a second distal end, the top plate having a first side edge and an opposed second side edge;
   a first sidewall extending from the first side edge of the top plate; and
   a second sidewall extending from the second side edge of the top plate;
   wherein the snowmobile tunnel includes a distal tapered portion having a tunnel width less than the track width;
   wherein a first portion of the first side edge and a first portion of the second side edge extends substantially parallel to the longitudinal axis and defines a first tunnel width;
   wherein a second portion of the first side edge and a second portion of the second side edge each taper toward the longitudinal axis to define a second tunnel width at the second distal end, the second tunnel width being less than the first tunnel width.

2. The snowmobile tunnel of claim 1, wherein the second tunnel width is less than the track width.

3. The snowmobile tunnel of claim 1, wherein the distal tapered portion extends between a transition plane having the first width and the second distal end having the second width, wherein an intersection plane that intersects the track is between the transition plane and the first distal end.

4. A snowmobile tunnel configured to cover at least a portion of an endless track having a track width, the snowmobile tunnel comprising:
 a top plate extending along a longitudinal axis from a first proximal end to a second distal end, the top plate having a first side edge and an opposed second side edge;
 a first sidewall extending from the first side edge of the top plate; and
 a second sidewall extending from the second side edge of the top plate;
 wherein the snowmobile tunnel includes a distal tapered portion having a tunnel width less than the track width;
  wherein the first sidewall and the second sidewall extend substantially perpendicular from the top plate.

5. The snowmobile tunnel of claim 1, wherein the second portion of the first side edge and the second portion of the second side edge angle at about 75° from a line perpendicular to the longitudinal axis.

6. The snowmobile tunnel of claim 1, wherein the first sidewall and the second sidewall taper from a transition plane to the second distal end.

7. A snowmobile tunnel configured to cover at least a portion of an endless track having a track width, the snowmobile tunnel comprising:
 a top plate extending along a longitudinal axis from a first proximal end to a second distal end, the top plate having a first side edge and an opposed second side edge;
 a first sidewall extending from the first side edge of the top plate; and
 a second sidewall extending from the second side edge of the top plate;
 wherein the snowmobile tunnel includes a distal tapered portion having a tunnel width less than the track width;
 wherein the first sidewall and the second sidewall taper from a transition plane to the second distal end;
 wherein the second distal end has a tunnel height of less than about 10 millimeters.

8. The snowmobile tunnel of claim 1, further comprising a tunnel bumper extending about the distal tapered portion, the tunnel bumper attached above the top plate at the second distal end to reduce an overall height of the tunnel at the second distal end.

9. The snowmobile of claim 1, wherein the second distal end is proximal a distalmost end of the endless track.

10. A snowmobile to traverse terrain, the snowmobile comprising:
 at least one front ski configured to steer the snowmobile;
 an endless track having a track width and configured to propel the snowmobile; and
 a chassis to which the at least one ski and the endless track are coupled to, the chassis including a tunnel partially covering at least a portion of the track, the tunnel including,
  a top plate extending along a longitudinal axis from a first proximal end to a second distal end,
  the top plate having a first side edge and an opposed second side edge,
  a first sidewall extending from the first side edge of the top plate, and
  a second sidewall extending from the second side edge of the top plate;
 wherein the tunnel includes a distal tapered portion having a tunnel width less than the track width;
 wherein a first portion of the first side edge and a first portion of the second side edge extends substantially parallel to the longitudinal axis and defines a first tunnel width, wherein a second portion of the first side edge and a second portion of the second side edge each taper toward the longitudinal axis to define a second tunnel width at the second distal end, the second tunnel width being less than the first tunnel width.

11. The snowmobile of claim 10, wherein the second tunnel width is less than the track width.

12. A snowmobile to traverse terrain, the snowmobile comprising:
 at least one front ski configured to steer the snowmobile;
 an endless track having a track width and configured to propel the snowmobile; and
 a chassis to which the at least one ski and the endless track are coupled to, the chassis including a tunnel partially covering at least a portion of the track, the tunnel including,
  a top plate extending along a longitudinal axis from a first proximal end to a second distal end,
  the top plate having a first side edge and an opposed second side edge,
  a first sidewall extending from the first side edge of the top plate, and
  a second sidewall extending from the second side edge of the top plate;
 wherein the tunnel includes a distal tapered portion having a tunnel width less than the track width;
 wherein the distal tapered portion extends between a transition plane having the first width and the second distal end having the second width, wherein an intersection plane that intersects the track is between the transition plane and the first distal end.

13. The snowmobile of claim 10, wherein the second distal end is proximal a distalmost end of the endless track.

14. The snowmobile of claim 10, further comprising a tunnel bumper extending about the distal tapered portion, the tunnel bumper attached above the top plate at the second distal end to reduce an overall height of the tunnel at the second distal end.

15. A snowmobile to traverse terrain, the snowmobile comprising:
 at least one front ski configured to steer the snowmobile;
 an endless track having a track width and configured to propel the snowmobile; and
 a chassis to which the at least one ski and the endless track are coupled to, the chassis including a tunnel partially covering at least a portion of the track, the tunnel including,
  a top plate extending along a longitudinal axis from a first proximal end to a second distal end,
  the top plate having a first side edge and an opposed second side edge,
  a first sidewall extending from the first side edge of the top plate, and
  a second sidewall extending from the second side edge of the top plate;
 wherein the tunnel includes a distal tapered portion having a tunnel width less than the track width,
 further comprising a tunnel bumper extending about the distal tapered portion, the tunnel bumper attached above the top plate at the second distal end to reduce an overall height of the tunnel at the second distal end;
 wherein the tunnel bumper is attached above the top plate with an L-shaped bracket.

16. The snowmobile of claim 10, wherein the first sidewall and the second sidewall taper from a transition plane to the second distal end.

17. A snowmobile to traverse terrain, the snowmobile comprising:
- at least one front ski configured to steer the snowmobile;
- an endless track having a track width and configured to propel the snowmobile; and
- a chassis to which the at least one ski and the endless track are coupled to, the chassis including a tunnel partially covering at least a portion of the track, the tunnel including,
- a top plate extending along a longitudinal axis from a first proximal end to a second distal end,
- the top plate having a first side edge and an opposed second side edge,
- a first sidewall extending from the first side edge of the top plate, and
- a second sidewall extending from the second side edge of the top plate;
- wherein the tunnel includes a distal tapered portion having a tunnel width less than the track width,
- wherein the distal tapered portion has a length that is about 11% to about 14% of a total length of the tunnel between the first proximal end to the second distal end.

* * * * *